F. N. BIERCE & E. T. JONES.
CONNECTION AND SEAL FOR THE ENDS OF ELECTRIC CABLES.
APPLICATION FILED DEC. 8, 1908.
965,684.
Patented July 26, 1910.
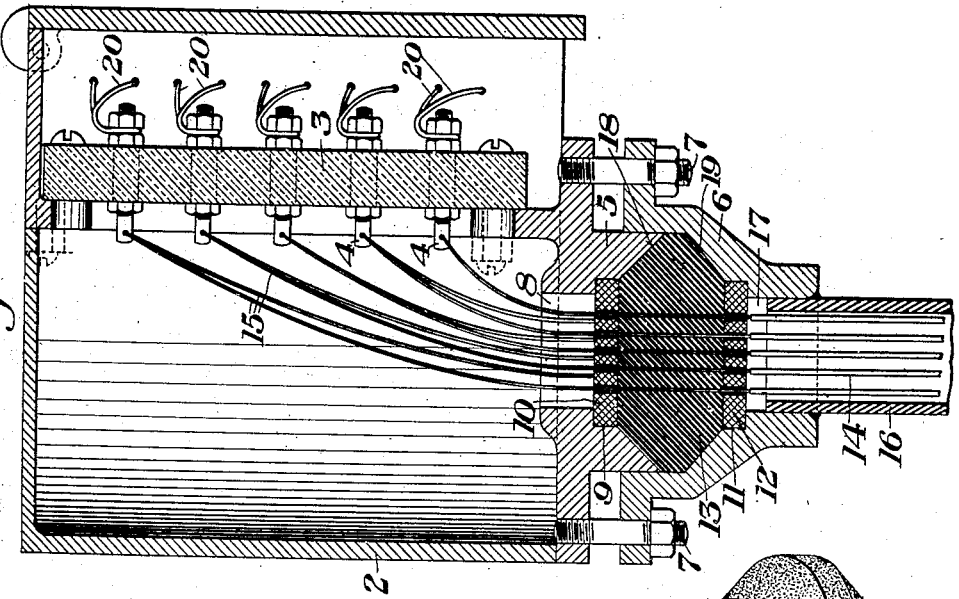
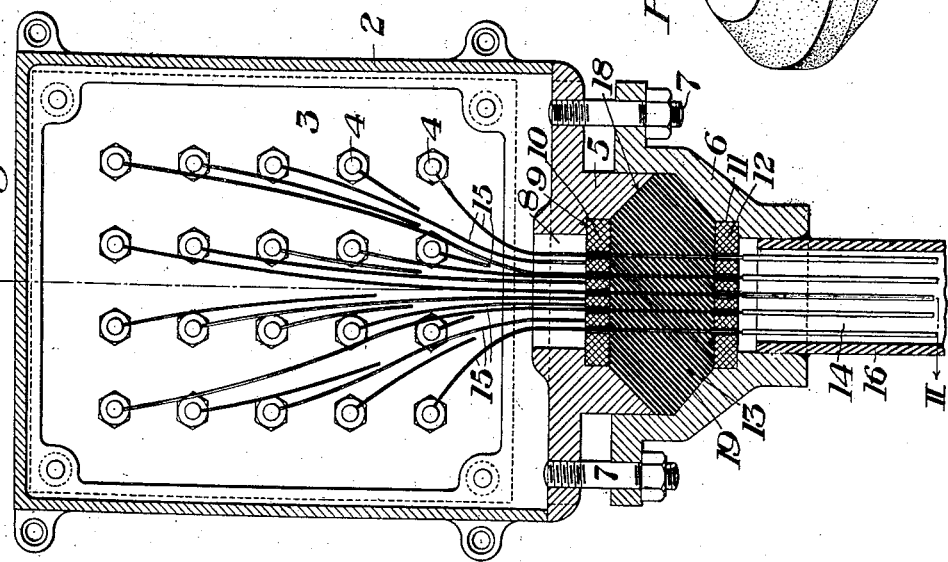
WITNESSES
INVENTORS.

UNITED STATES PATENT OFFICE.

FRED N. BIERCE AND EDWARD T. JONES, OF PITTSBURG, PENNSYLVANIA, ASSIGNORS OF ONE-THIRD TO CHARLES W. GERWIG, OF PITTSBURG, PENNSYLVANIA.

CONNECTION AND SEAL FOR THE ENDS OF ELECTRIC CABLES.

965,684.  Specification of Letters Patent.  Patented July 26, 1910.

Application filed December 8, 1908. Serial No. 466,574.

*To all whom it may concern:*

Be it known that we, FRED N. BIERCE and EDWARD T. JONES, both of Pittsburg, in the county of Allegheny and State of Pennsylvania, have invented a new and useful Improvement in Seals and Connections for the Ends of Electric Cables, of which the following is a full, clear, and exact description of a seal attached to a junction box, reference being had to the accompanying drawings, forming part of this specification, in which—

Figure 1 is a vertical section through one form of connection embodying our invention attached to a junction box; Fig. 2 is a vertical section on the line II—II of Fig. 1; and Fig. 3 is a perspective view of the packing member.

Our invention has relation to a connection for the end of a cable and is designed to provide means of novel and effective character for connecting and sealing the end of a cable having a series of separately insulated electric wires from exposure to the atmosphere.

The precise nature of our invention will be best understood by reference to the accompanying drawings, which will now be described, it being premised, however, that changes may be made in the details of construction and arrangement of parts by those skilled in the art, without departing from the spirit and scope of our invention.

In the drawings, 2 designates a junction box of any well known type, which is provided with a connection board 3 of insulation, such as slate or any other well known insulating material, and 4 designates a plurality of binding posts attached to this board 3.

Projecting from the lower end of the box 2 is a boss 5 forming the upper portion of a stuffing box, the other portion of which is formed by the gland 6 provided with a central orifice 17 and secured to the box by means of screws or bolts 7. Extending through the bottom of the box and concentric with the boss 5 is the orifice 8.

9 is a seat in the boss 5 to receive a disk 10 of insulating material, such as vulcanized-fiber, hard rubber or any insulating material. The lower end of this boss or gland is provided with the conical opening 18. 11 is a seat in the gland 6 to receive a disk 12 similar to the disk 10. The gland is also provided with the tapered bottom 19, and interposed between the disks 10 and 12 is a packing member 13 which is made of soft rubber, or other suitable material, which is a non-conductor, flexible, and impervious to moisture.

14 is a cable which is composed of a series of insulated wires 15, provided with a metallic casing 16.

Each of the disks 10 and 12, and the packing member are provided with orifices equal in number and in alinement with the wires 15 of the cable 14.

The casing 16 is removed from the end of cable 14, and the insulation is removed from the wires 15. The end of the cable is passed through the orifice 17 until the end of the casing is slightly below the seat 11. The casing is then secured to the gland 6 by means of solder or in any other manner to properly seal the end of the gland. The wires 15 are then passed through the orifices in the disk 12, packing member 13 and disk 10, and the free ends are then passed through the orifice 8 in the bottom of the junction box 2. The gland 6 is then secured to the box by means of the bolts 7, which are drawn tight enough to compress the member 13 around each of the wires 15, and also to fill all the space in the stuffing box to seal the end of the cable. The free end of each of the wires 15 is secured to one of the binding posts 4, and to the other end of the binding posts are secured the ends of wires 20 which lead to any desired point.

The advantages of our invention consist in providing a seal at the end of a cable where the separate wires lead to separate points, by means of an elastic member which is compressed in a confined space around each wire, and which will yield to the expansion and contraction of the various parts caused by varying temperatures; also in the provision of means whereby the metallic casing of the cable is secured to the junction box, and thereby supporting the cable by means of the casing and relieving the wires of the cable from all strain.

We claim:—

1. A junction box having an opening therethrough, a cable composed of a plurality of separate insulated wires, a metallic casing surrounding said cable, a stuffing box having a recess therein, one member of the stuffing box being secured to the junction box and the other member thereof being secured to the end of the cable casing, an elastic member in the recess of the stuffing box having an orifice for each of the wires of the cable, a rigid disk of insulating material on each end of the elastic member and within the recess in the stuffing box, each of the disks having an orifice in line with each of the orifices in the elastic member for the wires of the cable, and means to secure the members of the stuffing box to each other to compress the elastic member to seal and to secure the end of the cable to the junction box; substantially as described.

2. A junction box having an opening therethrough, a cable composed of a plurality of separate insulated wires, a metallic casing surrounding said cable, a stuffing box having a recess therein, one member of the stuffing box being secured to the junction box and the other member being secured to the end of the cable casing and having an annular flange, an elastic member in the recess in the stuffing box having an orifice for each of the wires of the cable, and bolts passing through the flange of the last mentioned stuffing box member and engaging threaded orifices in the junction box to secure the end of the cable and the stuffing box to the junction box; substantially as described.

3. A junction box for the end of a cable, having a stuffing box secured thereto provided with a recess, a cable composed of a plurality of separate insulated wires, a metallic casing surrounding said cable and secured to the stuffing box, a flexible member in the recess in the stuffing box, a rigid disk of insulating material on each end of the elastic member and within the recess in the stuffing box, an orifice in the elastic member and each of the disks for each of the wires of the cable, and means to compress the elastic member to seal the end of the cable casing; substantially as described.

4. A connection for the end of an electric cable composed of a plurality of separate insulated wires, a metallic casing surrounding said cable, a stuffing box having a recess therein, one member of the stuffing box being secured to the end of the cable casing, an elastic member in the recess of the stuffing box having an orifice for each of the wires of the cable, a rigid disk of insulating material on each end of the elastic member and within the recess in the stuffing box, each of the disks having an orifice in line with each of the orifices in the elastic member for the wires of the cable, and means to secure the members of the stuffing box to each other to compress the elastic member to seal the end of the cable; substantially as described.

In testimony whereof, we have hereunto set our hands.

FRED N. BIERCE.
EDWARD T. JONES.

Witnesses:
GEO. B. BLEMING,
JESSE B. HELLER.